March 20, 1962 — E. H. BRAUER, JR., ETAL — 3,026,115
EXPANDING CHUCK
Filed Feb. 16, 1960 — 2 Sheets-Sheet 1
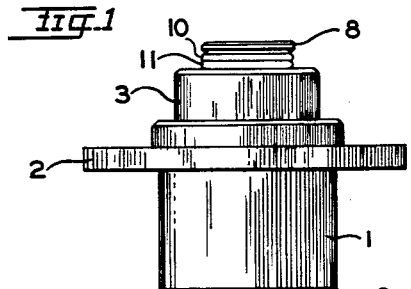
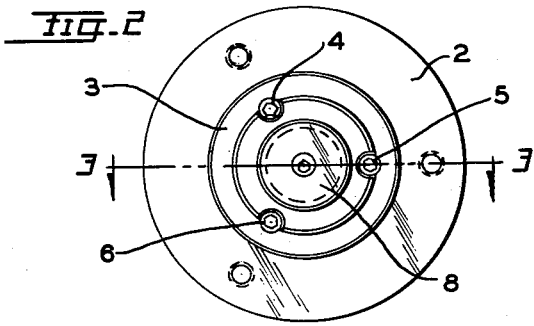
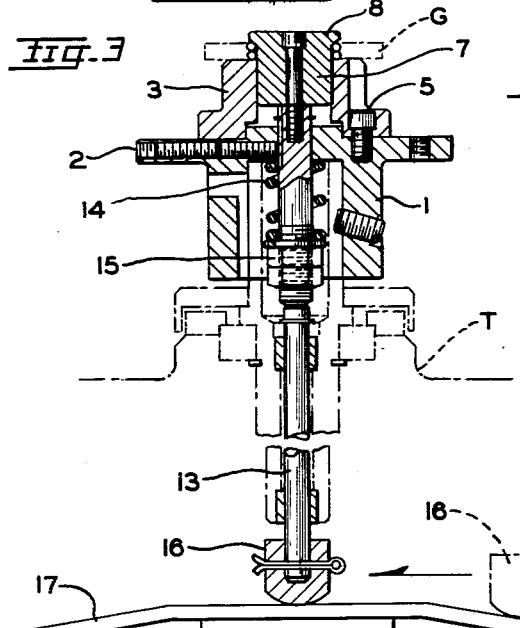
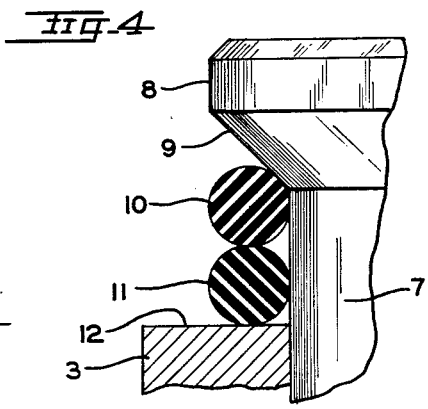
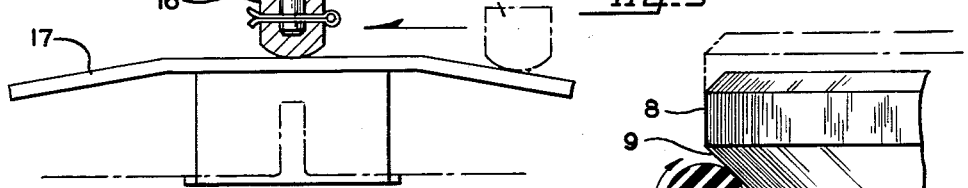
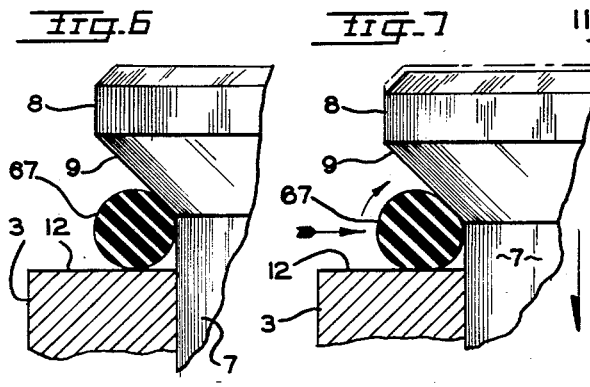
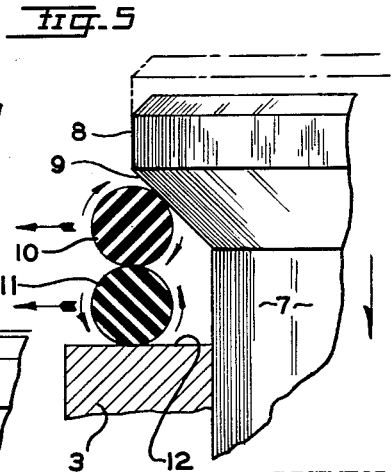
INVENTORS
EDWIN H. BRAUER, JR.
GILBERT J. JANKE
BY
Oberlin, Maky & Donnelly
ATTORNEYS March 20, 1962 E. H. BRAUER, JR., ETAL 3,026,115
EXPANDING CHUCK
Filed Feb. 16, 1960 2 Sheets-Sheet 2
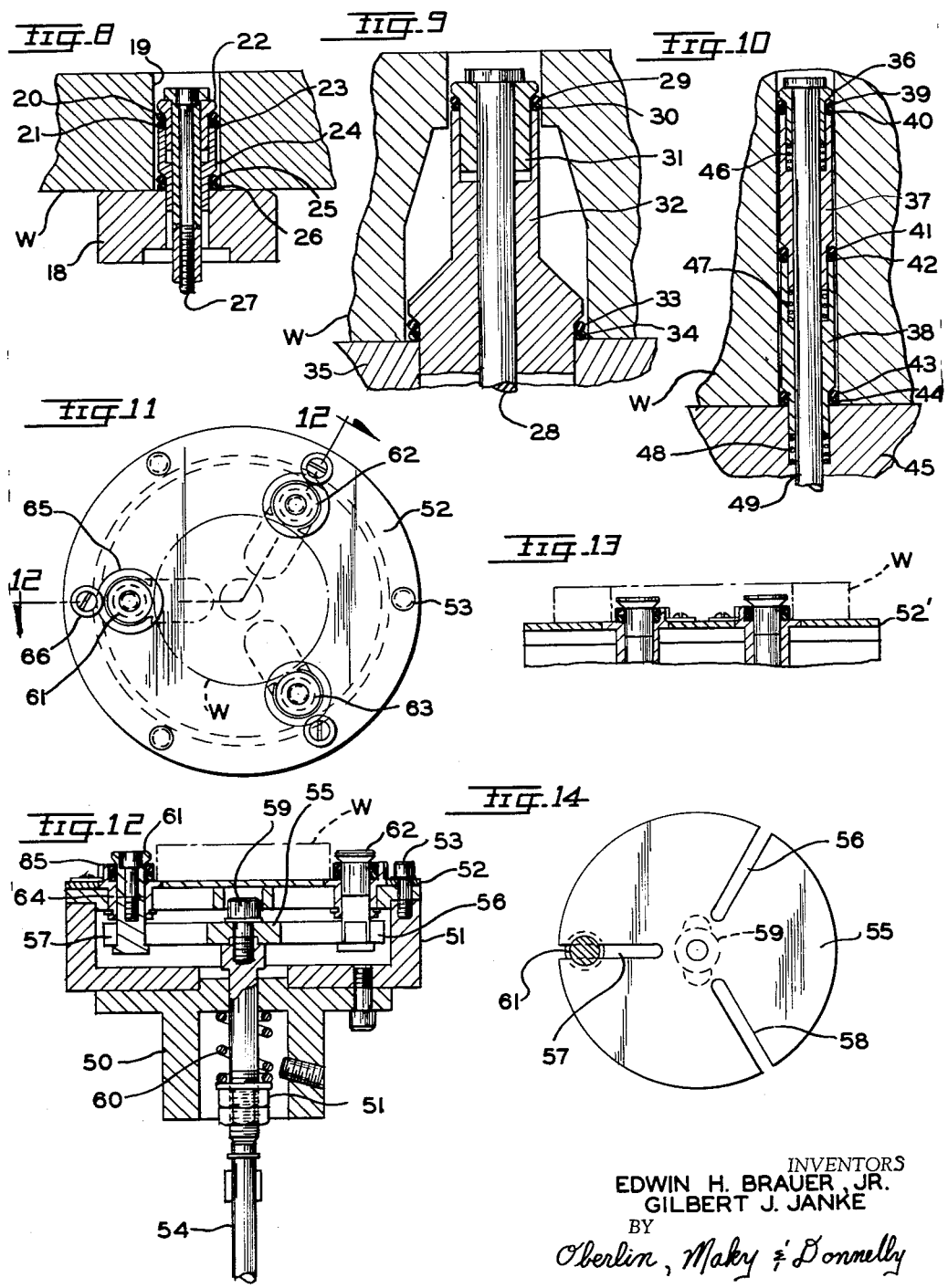
INVENTORS
EDWIN H. BRAUER, JR.
GILBERT J. JANKE
BY
Oberlin, Maky & Donnelly
ATTORNEYS

United States Patent Office 3,026,115
Patented Mar. 20, 1962

3,026,115
EXPANDING CHUCK
Edwin H. Brauer, Jr., Cleveland, and Gilbert J. Janke, Parma, Ohio, assignors to The Osborn Manufacturing Company, Cleveland, Ohio, a corporation of Ohio
Filed Feb. 16, 1960, Ser. No. 9,097
22 Claims. (Cl. 279—2)

This invention relates as indicated to a novel expanding chuck, and more particularly to a chuck adapted quickly to be engaged in and disengaged from an appropriate aperture in a work-piece.

A wide variety of expanding mandrels and chucks are well known in the art, certain of them being actuated by relative axial reciprocation of the component parts. Most of them, however, employ more or less radially expanding individual work engaging elements which contact the work-piece only in limited areas and may not obtain a secure grip thereon unless considerable force is applied thereto. It is usually important that rather precise concentricity be maintained and this may be difficult to accomplish under such conditions. Various resilient rings have also been utilized in internal chucks and mandrels, the resilient material being axially compressed to produce a limited outward bulging of the resiliently deformable material. The gripping action thereby obtained, however, is relatively low in comparison to the compressive force which requires to be applied thereto, and usually only a small degree of radially outward deformation is obtainable.

It is accordingly an important object of our invention to provide an expanding chuck utilizing a resiliently deformable work engaging element adapted to grip the work firmly and in a uniform manner.

Another object is to provide such chuck which will be relatively simple and inexpensive of manufacture and maintenance.

Still another object is to provide such chuck which will be capable of a relatively large degree of expansion without special adjustment or substitution of component parts, thereby making it adapted to handle a wide variety of work.

A further object is to provide such chuck which will be quick acting in operation and yet require a relatively small actuating force to obtain a strong chucking action.

A still further object is to provide such chuck which will automatically ensure excellent concentricity with the work.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a side elevational view of one form of chuck assembly embodying the principles of our invention;

FIG. 2 is a top plan view of the chuck of FIG. 1;

FIG. 3 is a vertical section taken on the line 3—3 on FIG. 2;

FIG. 4 is a diagrammatic elevation partly in section showing the principal component parts of our new chuck, prior to actuation of the same;

FIG. 5 is a view similar to FIG. 4 illustrating the manner of actuation to engage and chuck a work-piece;

FIGS. 6 and 7 are diagrammatic views similar to FIGS. 4 and 5 but showing but a single resiliently deformable element having relatively little chucking effectiveness;

FIGS. 8, 9 and 10 are vertical sections showing modified forms of internal chucks or mandrels embodying the principles of our invention;

FIG. 11 is a top plan view of another modification adapted for external chucking of a work-piece;

FIG. 12 is a vertical section taken on the line 12—12 on FIG. 11;

FIG. 13 is a fragmentary detail view corresponding to the upper portion of FIG. 12 but showing the individual chuck sleeves rotated 180° for internal chucking of the work; and FIG. 14 is a top plan detail view of the inner draw plate utilized to reciprocate certain portions of the chuck actuating mechanism in synchronism.

The chuck shown in FIGS. 1–3 inclusive of the drawing is of a type which may be utilized, for example, to chuck a work-piece such as a gear G to present the same to a power driven rotary brush for performance of a deburring operation thereon. Reference may be had to the co-pending applications of Edwin H. Brauer, Jr., Serial No. 832,063, filed August 6, 1959, for "Work Load and Unload Device," and Serial No. 832,064, filed even date therewith, for "Work Turnover Mechanism" for a description of suitable work handling means operative to place such work-pieces upon the chucks, to turn them over, and to replace them on the chucks, and to remove them from the chucks after completion of the deburring operation by the power driven rotary brushes. As will be apparent, however, the chucks of the present invention are adapted to a very wide range of uses.

Such chuck may comprise a cylindrical base portion 1 having a radially projecting annular flange 2 and carrying a concentric cylindrical upper housing portion 3 secured thereto by means of bolts 4, 5 and 6. Fitted for vertical reciprocation within such housing portion 3 is a chuck head member 7 having a wider upper end portion 8 with an inwardly sloping or tapered surface 9 (best shown in FIGS. 4–7) extending from such wider end portion 8 to the main body of the head 7. Two O-rings 10 and 11 of resiliently deformable elastomeric material encircle such vertically reciprocable head member 7 interposed between such tapered surface 9 and the opposed shoulder 12 formed by the upper surface of upper housing 3. Vertical reciprocation of head member 7 relative to such housing will accordingly serve to deform such O-rings in a manner explained more in detail below.

As shown in FIG. 3, a vertically downwardly extending actuating rod 13 may be connected to vertically reciprocable head 7 and encircled by a compression spring 14 interposed between the upper portion of base portion 1 and a stop nut 15 threadedly secured on such rod for adjustment of the compression of such spring. The action of the spring is accordingly normally to exert a predetermined downward pull on the vertically reciprocable head member 7. The entire chuck may, if desired, be mounted in a turntable indicated at T (see further the two prior applications referred to above), and rod 13 may be fitted at its lower end with a cam follower shoe 16 adapted to engage a fixed cam track 17 as the turntable rotates. It will thus be seen that rod 13 may be positively reciprocated in an upward direction against the action of compression spring 14 to reciprocate head 7 and thereby relieve the pressure tending to compress the two O-rings 10 and 11 between the tapered shoulder 9 and the flat shoulder 12.

Referring now to the modification illustrated in FIG. 8, the internal chuck there illustrated comprises a base or body portion 18 on which the work W is adapted to rest with the chucking elements proper extending within the aperture 19 therein. Two O-rings 20 and 21 are interposed between the tapered shoulder of the vertically reciprocable member 22 and the upper surface of reciprocable member 24. O-rings 25 and 26 are similarly interposed between the tapered shoulder of member 24 and the upper surface of fixed base member 18. Consequently, when a downward pull is now exerted on rod 27, both sets of O-rings 20, 21 and 25, 26 are forced radially outwardly to engage and grip the surface of opening 19 in work-piece W.

The embodiment shown in FIG. 9 is basically similar to that of FIG. 8 but modified to chuck the work in two axially spaced regions where the opening in the workpiece W is of greater diameter in one such region than in the other. Thus, exertion of a downward force on pull rod 28 serves to compress the pair of O-rings 29, 30 due to reciprocation of head member 31 relative to lower member 32, with simultaneous compression of O-rings 33 and 34 between the tapered shoulder on such member 32 and the work supporting base 35.

The FIG. 10 embodiment is in turn generally similar to that of FIGS. 8 and 9 but includes provision for engaging the surface of the internal opening in the work W in three axially spaced regions therealong. Three cylindrical interfitting members 36, 37 and 38 are provided with pairs of O-rings 39, 40 interposed between the tapered shoulder of member 36 and the opposed horizontal shoulder of member 37 and O-rings 41 and 42 interposed between the tapered shoulder on member 37 and the opposed flat shoulder on the upper end of member 38. The air of O-rings 43, 44 are interposed between the tapered shoulder on member 38 and the work supporting base 45. In this embodiment, compression spring 46 may be interposed between the lower end of member 36 and member 37, compression spring 47 may be interposed between the lower end of member 37 and member 38, and compression spring 48 may be interposed between the lower end of member 38 and base member 15, instead of relying upon the normal resilient character of the O-rings to return them to their unexpanded condition with consequent relative reciprocation of the interfitting members 36, 37 and 38 upon relieving the downward force on pull rod 49.

In the FIGS. 11–14 embodiment of the invention, a plurality of chucking heads are provided in order that they may conjointly engage and grip the outer diameter of a work-piece or, alternatively, conjointly engage and grip the inner diameter of a relatively large opening in a work-piece. In the form illustrated, this chuck comprises a base 50 fixed against vertical movement and carrying an upper cylindrical housing 51 having a cover plate 52 removably secured thereon as by means of screws 53. An unchucking push rod 54 extends vertically through base member 50 and carries at its upper end a radially slotted draw plate 55, in this instance having three radial slots 56, 57 and 58 therein spaced equally 120° apart. Screw 59 serves to secure such plate to the upper end of rod 54. A compression spring 60 interposed between the upper portion of member 50 and the threaded nut stop member 51 on rod 54 serves to urge such rod and plate 55 downwardly. The three vertically reciprocable chuck heads 61, 62 and 63 are fitted for vertical reciprocation in individual sleeves such as 64 having upwardly projecting arcuate collars 65 exposing only the sides of the individual chucks directed radially inwardly of the over-all assembly (see FIG. 11). The lower ends of members 61, 62 and 63 are secured in the corresponding slots 57, 56 and 58 of draw plate 55 so that they may be vertically reciprocated in synchronism. The respective collars such as 65 are held in properly adjusted positions circumferentially of the vertical axes of the respective members 61, 62 and 63 by means of washers such as 66. Pairs of O-rings are interposed between the enlarged tapered heads of members 61, 62 and 63 and the horizontal surfaces of such sleeves flush with cover plate 52 in the same manner described above with regard to FIGS. 1–4 inclusive and are themselves closely encircled by the respective arcuate collars such as 65 except for the portions of their peripheries left exposed toward the center axis of the assembly. Consequently, the action of compression spring 60 tending to urge rod 54 downwardly and accordingly likewise draw plate 55 and members 61, 62 and 63 serves to expand such O-rings inwardly of the assembly to grip the outer diameter of work-piece W in three circumferentially spaced regions. The work-piece may, of course, be released upon manual or automatic upward reciprocation of push rod 54.

By substituting other cover plates 52, adapted to receive the individual chucks at different radial spacings, the device may be adjusted to accommodate work-pieces of widely varying size, the lower ends of head members 61, 62 and 63 being correspondingly shifted along radial slots 57, 56 and 58 of draw plate 55.

Furthermore, this chuck may readily be adjusted for internal chucking of a work-piece having a relatively large central opening therein simply by loosening the screws securing the washers such as 66 holding the arcuate collars such as 65 in predetermined position and rotating such collars so that the portions of the O-rings radially outwardly of the over-all assembly are exposed for engagement with the work. An arrangement of the type last referred to is illustrated in FIG. 13 of the drawing.

It will be apparent that a wide variety of materials may be employed in the manufacture of our new chuck, but the relatively reciprocable members will ordinarily be of steel and the O-rings may be of any resiliently deformable elastomeric material commonly utilized in the manufacture of O-rings, including natural rubber and synthetic rubbers such as neoprene.

While our new chuck requires application of but a relatively small force to be exerted on the pull rod to achieve effective radial expansion of the O-rings to grip the work to be chucked, the latter is nevertheless very securely held thereby, particularly against rotation about the chuck head or spindle. A very uniform internal grip is achieved on the work in contrast to prior art internal chucks where the work may be engaged in several circumferentially spaced regions only. Unusually large expansion of the internal chuck is obtained (e.g. one-quarter inch) and such expansion is uniform so that excellent concentricity of the work to the spindle is maintained. While the results thus achieved demonstrate the advantages of our new chuck and we accordingly do not wish to be limited to any particular theory or explanation of the reasons underlying the unexpected effectiveness of the construction described above and set forth in the following claims, nevertheless reference may be had to FIGS. 4–7 inclusive of the drawing for a further understanding of the manner in which such chuck appears to operate. The work is, of course, placed over the chuck head when the latter is in the FIG. 4 position with the O-rings against the shank or spindle portion of the head 7. Upon reciprocation of such head in the manner indicated in FIG. 5, O-ring 10 is caused to roll up the tapered or inclined surface 9 of the wider end portion 8 with consequent opposite rotation of O-ring 11 due to frictional engagement with the latter, much in the manner of two intermeshed gears. This, of course, causes such O-ring 11 to roll outwardly on the surface 12 so that both such O-rings will engage the inner peripheral surface of an aperture in a work-piece encircling the chuck head. This rolling action of the O-rings avoids sliding friction, and accordingly a relatively small pull on the reciprocable head or spindle is necessary.

For purposes of comparison, reference may now be had to FIGS. 6 and 7 of the drawing showing but a single O-ring 67 interposed between the tapered shoulder 9 and surface 12. When head 7 is reciprocated from the FIG. 6 to the FIG. 7 position, the O-ring tends to roll up the tapered surface 9 and therefore to expand, but it is also in frictional engagement with surface 12 so that such force is counteracted and the ring is merely somewhat squashed with but a small degree of radially outward deformation. Moreover, a relatively strong pull must be exerted on chuck head 7 to achieve even this small amount of deformation. As used herein, the term "chuck" is intended broadly to include a wide variety of work gripping devices, both internal and external.

We prefer to employ natural or synthetic rubber O-rings in accordance with our invention, but certain synthetic plastics such as polyurethane may also be utilized, particularly if the surface is treated to render it relatively frictional. The rings may be slightly serrated for this purpose and will preferably be of the same size and diameter.

It will be apparent that both of the surfaces 9 and 12 may be inclined away from one another, if desired, or surface 12 may be inclined and surface 9 normal to cylindrical surface 7. In the embodiment illustrated in FIG. 4, the flat surface 12 is adapted to support a work-piece resting thereon in a precisely defined position. In addition to use for the chucking of work-pieces, the principles of our invention may obviously be employed to chuck tools or to join together other members as may be desired. Thus, by counter-rotating the mutually contacting surfaces of the two O-rings, such rings may be caused to expand or contract and either action may be utilized to perform the chucking function. Such rotation or twisting of the rings (less than 180°), of course, also assists in returning such rings to original shape and size when the expanding pressure has been released.

Other modes of applying the principle of the invention may be employed, change being made as regards the details described, provided the features stated in any of the following claims or the equivalent of such be employed.

We therefore particularly point out and distinctly claim as our invention:

1. A chuck comprising inner and outer relatively reciprocable members, an outwardly inclined surface on one said member, the other said member having a surface opposed to said inclined surface, and two O-rings of resiliently deformable material encircling said inner member and interposed between said opposed surfaces, said O-rings being in lateral engagement with each other.

2. The chuck of claim 1, including resilient means normally urging said opposed surfaces toward each other to deform said O-rings radially outwardly.

3. The chuck of claim 1, wherein said outer member provides a surface on which a work-piece to be chucked may be supported with said inner member and said O-rings being received within an opening in such work-piece.

4. The chuck of claim 1, including resilient means normally urging said opposed surfaces toward each other to deform said O-rings radially outwardly, and cam means operative to reciprocate said members relative to each other to move said opposed surfaces apart to permit said O-rings to shrink elastically radially inwardly.

5. The chuck of claim 1, including means resiliently urging said members toward relative reciprocation in one direction, and operating means connected with one said member operable relatively to reciprocate said members in the opposite direction.

6. A chuck comprising a plurality of axially disposed sets of inner and outer relatively reciprocable members, opposed shoulders of adjacent members being exposed and at least one of each pair of said opposed shoulders being outwardly inclined, and two O-rings of resiliently deformable material encircling the inner member of each said set between each pair of opposed shoulders, said O-rings being in lateral engagement with each other.

7. The chuck of claim 6, including means operable simultaneously relatively to reciprocate said members to move said opposed shoulders toward each other to deform said O-rings radially outwardly and away from each other to permit said O-rings to shrink elastically radially inwardly.

8. The chuck of claim 6, wherein said sets of members and the O-rings mounted thereon are of different diameters axially of the assembly.

9. The chuck of claim 6, wherein said members are successively received in a next adjacent member for relative axial reciprocation, and resilient means interposed between said adjacent members normally urging the assembly into axially extended position.

10. The chuck of claim 6, wherein said members are successively telescopically received in a next adjacent member for relative axial reciprocation.

11. A chuck comprising a holder; a plurality of laterally spaced chucking units mounted in said holder, each said unit comprising inner and outer relatively reciprocable members, an outwardly inclined surface on one said member, the other said member having a surface opposed to said inclined surface, and two O-rings of resiliently deformable material encircling said inner member and interposed between said opposed surfaces, said O-rings being in lateral engagement with each other, and said units being thus mounted in said holder for such relative reciprocation in parallelism; and means for relatively reciprocating said members of each said unit synchronously.

12. The chuck of claim 11, including resilient means urging said members toward relative reciprocation in one direction, and operating means connected with one said member of each said unit operable to reciprocate said members in the opposite direction.

13. The chuck of claim 11, including adjustable mounting means for said units to locate said units at different selected distances radially outwardly from a common center.

14. The chuck of claim 11, including collars on said holder partially encircling said O-rings of said individual units to limit radial expansion of said O-rings in certain directions only.

15. The chuck of claim 11, including collars on said holder partially encircling said O-rings of said individual units to limit radial expansion of said O-rings in certain directions only, and means mounting said collars for pivotal adjustment about the respective axes of said units.

16. A chuck comprising inner and outer relatively reciprocable members, an outwardly inclined surface on one said member, the other said member having a surface opposed to said inclined surface, two O-rings of resiliently deformable material encircling said inner member and interposed between said opposed surfaces, said O-rings being in lateral engagement with each other, and a collar partially encircling said O-rings to limit radial expansion thereof in certain directions only.

17. A chuck comprising relatively reciprocable members defining a space therebetween of gradually increasing dimensions outwardly, and two rings of circular cross-section of resiliently deformable material interposed between said members in such space, said rings being in lateral engagement with each other and of substantially the same size and diameter whereby such reciprocation of said members to constrict such space serves to cause radial expansion of said rings.

18. Releasable gripping means comprising two members defining an annular outwardly flaring space therebetween and mounted for relative axial reciprocation to enlarge and constrict such space, and two co-axial rings of circular cross-section of resiliently deformable material interposed between said members in such space, said rings being in lateral engagement with each other and of substantially the same size and diameter whereby such reciprocation of said members to constrict such space serves to cause radial resilient expansion of said rings.

19. In combination, two interfitting members defining an annular space therebetween, a pair of similar co-axial rings of circular cross-section of resiliently deformable material encircling the inner of said members within such space, and means operable resiliently to alter the diameters of said rings while counter-rotating the mutually contacting surfaces of said rings thereby to grip a said member.

20. The method of gripping an article having an opening therein which comprises inserting a pair of O-rings of resiliently deformable material within such opening, holding such O-rings in co-axial relationship with their respective opposed end surfaces in tight engagement, and mutually counter-rotating such rings about the respective center lines of the ring bodies to expand such rings to engage the inner surface of such article.

21. The method of expanding O-rings which comprises holding a pair of O-rings of resiliently deformable material in co-axial relationship with their respective opposed end surfaces in tight engagement with each other, and then mutually frictionally counter-rotating the engaging surfaces thereof.

22. The method of expanding O-rings diametrically which comprises holding a pair of O-rings of resiliently deformable material in co-axial relationship with their respective opposed end surfaces in tight engagement with each other, and then expanding one such O-ring by twisting the same through its cross-section frictionally to rotate the engaging surfaces of such respective O-rings in opposite directions with consequent expansion of the other such O-ring also.

References Cited in the file of this patent

UNITED STATES PATENTS

| | | |
|---|---|---|
| 1,854,825 | Connell | Apr. 19, 1932 |
| 2,105,618 | Silva | Jan. 18, 1938 |
| 2,513,412 | Holsing | July 4, 1950 |
| 2,830,821 | Bystrom | Apr. 15, 1958 |